United States Patent Office 3,354,054
Patented Nov. 21, 1967

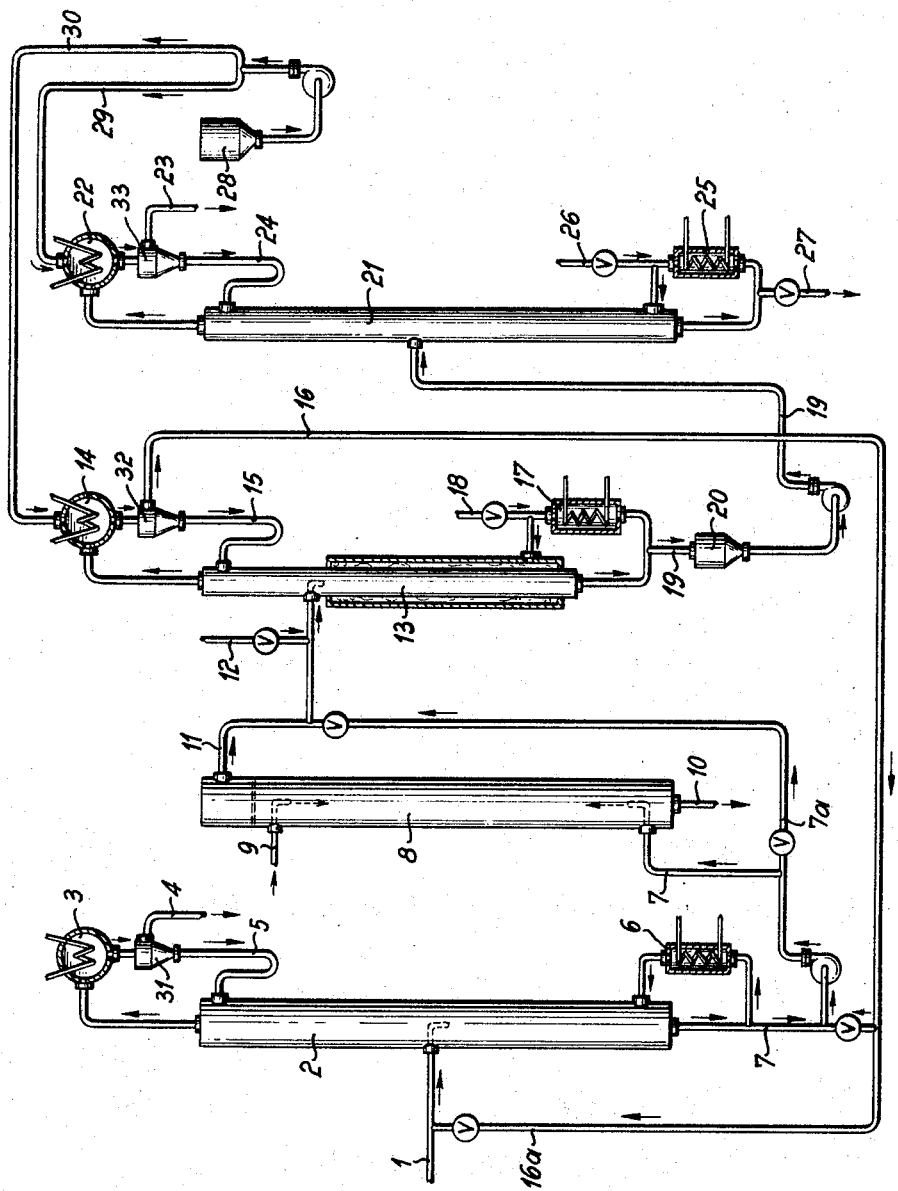

3,354,054
PROCESS FOR ISOLATING AND PURIFYING 1-CYANOBUTADIENE-(1,3) BY PLURAL STAGE DISTILLATION IN THE PRESENCE OF NITROGEN OXIDE
Kurt Sennewald, Knapsack, near Cologne, and Peter Wirtz, Cologne-Lindenthal, Germany, assignors to Knapsack Aktiengesellschaft, a corporation of Germany
Filed June 1, 1964, Ser. No. 371,359
Claims priority, application Germany, May 30, 1963, K 49,862
8 Claims. (Cl. 203—8)

ABSTRACT OF THE DISCLOSURE

Process for isolating and purifying 1-cyanobutadiene-(1,3) from a reaction mixture formed, inter alia, by reacting monovinyl acetylene and hydrocyanic acid in Nieuwland catalyst or by thermal splitting of 1-acetoxy-1-cyanobutene-(2) comprising admixing the reaction mixture with a phenol and a nonvolatile acid, introducing the mixture into the upper portion of a first distillation zone, introducing nitrogen monoxide into the lower portion of said first distillation zone, conducting the cyanobutadiene-containing product remaining in the sump of said first distillation zone to the center portion of a second distillation zone, introducing nitrogen monoxide into the lower portion of said second distillation zone and removing monomeric cyanobutadiene from the top of said second distillation zone.

---

The present invention is concerned with a process for isolating and purifying 1-cyanobutadiene-(1,3) (briefly termed hereinafter "cyanobutadiene"), and with an apparatus suitable for use in carrying out this process. More particularly, the invention is concerned with the stabilization of mixtures containing cyanobutadiene during the distillative treatment thereof.

Cyanobutadiene is primarily prepared by two conventional processes:

(1) As taught in German Patents Nos. 850,889 and 851,185, cyanobutadiene is obtained from monovinyl acetylene and hydrocyanic acid in a Nieuwland catalyst according to the following equation:

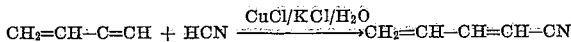

$$CH_2=CH-C\equiv CH + HCN \xrightarrow{CuCl/KCl/H_2O} CH_2=CH-CH=CH-CN$$

Analogously, cyanobutadiene can be obtained as a by-product in the joint manufacture of acrylonitrile and monovinyl acetylene from acetylene and hydrocyanic acid in a Nieuwland catalyst.

(2) As taught in British Patent No. 879,054, 1-acetoxy-1-cyanobutene-(2) can be transformed by thermal splitting to cyanobutadiene:

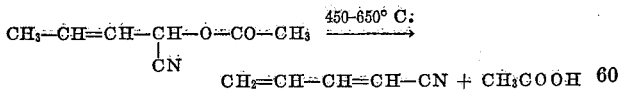

$$CH_3-CH=CH-CH-O-CO-CH_3 \xrightarrow{450-650°\,C.}$$
$$\quad\quad\quad\quad\quad\quad | $$
$$\quad\quad\quad\quad\quad\; CN$$
$$CH_2=CH-CH=CH-CN + CH_3COOH$$

1-benzoyloxy-1-cyano-butene-(2) may also be used as the starting material in this reaction.

Cyanobutadiene finds widespread use as an intermediate product. Thus, it may be used for making 1,4- dicyanobutene - (2), 1,2,4 - tricyanobutane, 1,2,4 - butanetricarboxylic acid, and hexamethylene diamine. Compounds having active hydrogen atoms react with cyanobutadienes as follows:

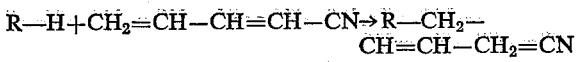

$$R-H+CH_2=CH-CH=CH-CN \rightarrow R-CH_2-CH=CH-CH_2=CN$$

Furthermore, cyanobutadiene which is an extremely polymerizable monomer, is very useful for making homopolymers and copolymers.

Previously, it has not been possible to subject cyanobutadiene to continuous distillation not associated with simultaneous undesired polymerization or dimerization. The polymerization entrains rapid obstruction in the columns, and the dimerization entrance high substance losses in monomeric cyanobutadiene. Due to its active diene system, cyanobutadiene may undergo both reaction.

The polymerization may take place in the 1,2 or 1,4-position. Depending on the polymerization mechanism involved, a crumbly, so-called "crumble polymer" of almost crystalline appearance or a viscous-plastic, latex-like "bulk or block polymer" will be obtained. On growing, the latter may even cause the column to crush.

Cyanobutadiene consists of a mixture of the cis- and trans-compounds which distinguish from one another in their reactivity with respect to the diene synthesis.

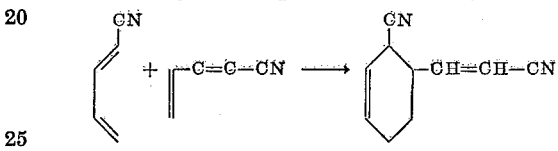

Thus, for example, trans-cyanobutadiene is dimerized to the extent of 66% on being heated for 16 hours at 100° C., whereas cis-cyanobutadiene is merely dimerized to the extent of 13%. Cyanobutadiene must therefore be distilled under mild conditions at fairly low temperatures. The dimer is liquid and monomer-soluble.

Even with the addition of conventional stabilizers for cyanobutadiene, such as hydroquinone, picric acid or sodium nitrite, for example, the distilling columns become clogged after a short distillation period by cyanobutadiene polymers, and the losses in monomeric cyanobutadiene are high.

The present invention unexpectedly provides a continuous process for isolating and purifying 1-cyanobutadiene-(1,3), wherein a liquid mixture of the type obtained in the manufacture of cyanobutadiene by conventional methods, is admixed with a mono- or polyhydric phenol and a non-voltatile acid serving as a stabilizer; the resulting mixture is introduced into the upper portion of a first distilling stage; low-boiling constituents of the said stabilized liquid mixture such, for example, as acrylonitrile, water, crotonaldehyde, are removed at the top portion of said first distilling stage at a temperature of about 38 to 58° C., preferably 47 to 49° C., and at a pressure within the range of about 100 to 400 mm. mercury, preferably 180 mm. mercury; gaseous nitrogen monoxide is introduced in measured amounts into the lower portion of said first distilling stage above a sump zone therein; cyanobutadiene-containing product collecting in said sump zone is caused to flow approximately into the center portion of second distilling stage operated under reduced pressure of preferably 5–20 mm. mercury; monomeric cyanobutadiene is withdrawn at the top portion of said second distilling stage, preferably at a temperature of about 25–36° C.; gaseous nitrogen monoxide is introduced in measured amounts into the lower portion of said second distilling stage above a sump zone therein; and dimeric and polymeric cyanobutadiene and higher-boiling impurities are retained in said sump zone in said second distilling stage having a temperature of at most 75° C., and ultimately expelled therefrom.

$3/100$ to 1% by weight, preferably about 0.5% by weight, calculated on the crude cyanobutadiene feed, each of a phenol and/or a non-volatile acid dissolved in pure cyanobutadiene, may also be added as a stabilizer at the top portions of each of the first and the second distilling stages.

The stabilizing phenol is, for example, hydroquinone and the stabilizing non-volatile acids include, for example, phosphoric acid, sulfuric acid, toluene-sulfonic acids or naphthalene sulfonic acids. Furthermore, it is advantageous to use such substances as the stabilizer as contain phenolic hydroxyl groups, acid groups and optionally nitroso groups attached to one molecule, for example ortho-, meta-, para-phenolsulfonic acids, α- or β-naphtholsulfonic acids, 1-naphthol-2-nitroso-4-sulfonic acid or 1-naphthol-2-nitroso-4,7-disulfonic acid.

Speaking generally, $10^{-3}$ to $10^{-1}$ percent by weight nitrogen monoxide, calculated on the crude cyanobutadiene feed, is introduced into the first and into the second distillation stages as the stabilizer.

For diluting the product collecting in the sump portion of the second distillation stage and for improving the distillation of the cyanobutadiene, up to 10% by weight high-boiling inert hydrocarbons, for example trimethylbenzenes, may be admixed with the product collecting in the sump portion of the second distillation stage.

The process of the present invention obviates the obstruction of the distilling columns by polymer formation and permits undisturbed uninterrupted operation by using stabilizers which are effective both in the gaseous and liquid phases and by using distillation means which permit mild distillation under low pressure.

The nitrogen monoxide (NO) introduced at a position immediately above the still portions into the cyanobutadiene vapors may optionally be diluted with nitrogen. Stabilization of the liquid phases is also achieved, especially when the NO is directly introduced into the still portions, due to the minor solubility of NO in cyanobutadiene and due to the solubility of NO in water or the formation of nitrous acids, water being present in the cyanobutadiene mixture used as the feed in the proportion of 1 to 1.8% by weight.

It is an essential embodiment of the present invention that the liquid phase is further stabilized by adding two components soluble in cyanobutadiene, one of which, i.e. the non-volatile acid, is intended to bind substances of basic activity which may possibly initiate anionic polymerization. NO and hydroquinone on the other hand are intended to neutralize radical initiators.

The process of the present invention is especially suitable for use in the preparation of pure cyanobutadiene from acrylonitrile solutions. When acrylonitrile and monovinyl acetylene are prepared jointly by introducing acetylene and hydrocyanic acid into an aqueous, slightly hydrochloric acid solution of CuCl and KCl, 1-cyanobutadiene-(1,3) will be obtained as a by-product. On purifying the acrylonitrile in conventional manner, the by-product is separated in a so-called residue column, in which acrylonitrile is distilled off at the top portion, whereas high-boiling constituents, primarily cyanobutadiene and lactonitrile remain in the sump portion of said column.

Depending on the temperature maintained in the sump portion, the product collecting in the sump portion of said residue column contains from 75 to 55% by weight acrylonitrile and from 5 to 35% by weight cyanobutadiene composed of monomeric cis- and trans-cyanobutadienes, dimeric or polymeric cyanobutadiene.

Such dilute cyanobutadiene solution may be fed directly to the distillation means used in accordance with the present invention or, more preferably, it may be extracted in counter-current manner with water by conventional means, for example by a process of the type described in U.S. Patent No. 2,947,777, the acrylonitrile content being thus reduced to 1 to 15% by weight and the cyanobutadiene content being increased to 75 to 95% by weight. After such treatment, residual acrylonitrile is separated in the preliminary column (first distilling stage) of the distillation means described in greater detail in Example 1 below, and monomeric cyanobutadiene is separated from dimeric and polymeric cyanobutadiene in the purifying column (second distilling stage). The acrylonitrile obtained in the preliminary column which in this case may still include cyanobutadiene can be returned to the extracting stage, so that only a small number of trays need be used in the preliminary column.

The cyanobutadiene is obtained in the purifying column in a degree of purity sufficient for polymerization purposes.

Monomeric cyanobutadiene is obtained in a yield of 95 to 98%. Cyanobutadiene prepared from 1-acetoxy-1-cyano-butene-(2) by the process described in British Patent No. 879,054 which in addition to 95–97% by weight cyanobutadiene, for example, also contains water, crotonaldehyde, acrylonitrile and traces of hydrocyanic acid, acetic acid, and acrolein, can also be obtained in very pure form as more fully described in Example 1 below.

The following examples illustrate the invention with reference to the accompanying drawing, the percentages being by weight:

Example 1

Acrylonitrile coming from the production means used for the joint preparation of acrylonitrile and monovinyl acetylene from acetylene and hydrocyanic acid in an aqueous hydrochloric acid cuprous chloride catalyst, which was free from low-boiling constituents (e.g. monovinyl acetylene) but included high-boiling constituents, e.g. 1.5% 1-cyanobutadiene-(1,3) (boiling point: 145° C. under a pressure of 760 mm. mercury) and 0.15% lactonitrile (boiling point: 183° C. with decomposition under a pressure of 760 mm. mercury), was caused to flow through line 1 into residue column 2 operated preferably under a pressure of 230 mm. mercury. At the top portion of column 2 there escaped pure acrylonitrile at 45° C. which was condensed in cooler 3 so as to flow into series-connected overflow vessel 31 from which it was partially removed through line 4 and partially refluxed in the ratio of 1:1 through line 5 into column 2. The sump product was distilled off at a temperature of 58° C. produced by heating means 6. The sump product which in addition to residual acrylonitrile also contained the high-boiling constituents, more especially 15–30% cyanobutadiene and 0.5 to 3% lactonitrile, was continuously conveyed by pumping through line 7 into water-charged extraction column 8 in which the specifically lighter cyanobutadiene flowed upward. A further amount of water was introduced through top line 9 so as to become saturated in countercurrent manner with the more readily soluble constituents including acrylonitrile and lactonitrile, and was continuously returned through bottom discharge line 10 into a stripping column. The crude cyanobutadiene thus concentrated and freed from lactonitrile, which was composed of about 3% acrylonitrile, 1.5% water, 0.5% crotonaldehyde, 65% monomeric cyanobutadiene and 30% dimeric and polymeric cyanobutadiene was removed at the head portion of extracting column 8 through line 11. 0.5% hydroquinone and 0.1 to 0.5% p-toluene-sulfonic acid in cyanobutadiene, calculated on the amount of crude cyanobutadiene flowing off, was added through line 12. The pH-value of a crude cyanobutadiene sample diluted with aqueous mehanol should not exceed 3–4; if higher, more p-toluene-sulfonic acid must be added.

The crude cyanobutadiene flowed from line 11 into the upper end portion of preliminary column 13 which was jacketed and heated with vacuum vapor at a temperature of 65° C. The low-boiling constituents including acrylonitrile, water, crotonaldehyde and about 1–2% of the total cyanobutadiene were removed at the head portion of preliminary column 13 which was operated at a temperature of 47–49° C. and under a pressure of 180 mm. mercury, condensed in cooler 14 and stabilized with 0.5% hydroquinone dissolved in cyanobutadiene, the percentage being calculated on the crude cyanobutadiene feed.

About 50% of the distillate was refluxed through overflow vessel 32 and line 15 to column 13 and the balance thereof was returned through lines 16 and 7 into extraction column 8. The sump portion of the column was maintained at a temperature of 60–65° C. produced by heating means 17; the product collecting in the sump portion of preliminary column 13 contained acrylonitrile, water and crotonaldehyde in a proportion of less than 0.1%. 270 parts per million nitrogen monoxide per kg. cyanobutadiene put through were introduced through socket 18 disposed immediately above the still portion into preliminary column 13 so as to stabilize the gaseous phases.

The sump product in preliminary column 13 which consisted of pre-purified cyanobutadiene, was introduced through line 19 and filter 20 into approximately the center portion of purifying column 21 maintained under a pressure of about 6 mm. mercury. Pure monomeric cyanobutadiene was distilled off at the head portion of the column at about 25° C., condensed in cooler 22, stabilized with 0.5% hydroquinone dissolver in cyanobutadiene, calculated on the cyanobutadiene put through, and removed through series-connected overflow vessel 33 and line 23, while a portion thereof (reflux ratio: 1:1) was refluxed through line 24 to the head portion of purifying column 21. The sump product was distilled off at a temperature of about 75° C. produced by heating means 25. At the temperatures used in column 21, the losses in monomeric cyanobutadiene by dimerization amounted to 3%. 250 parts per million gaseous nitrogen monoxide, calculated on the cyanobutadiene put through, were introduced into the cyanobutadiene vapors through socket 26 disposed above the still portion so as to stabilize the gaseous phases. The sump product, which contained dimeric cyanobutadiene and high-boiling residues and could be used for making dimeric cyanobutadiene or burnt, was removed through bottom discharge line 27.

Vessel 28 contained as the stabilizing solution, for example a solution of hydroquinone in pure cyanobutadiene which was conveyed by pumping through lines 29 and 30 to the cooling means 14 and 22 in the two cyanobutadiene distilling stages.

The above conditions permitted undisturbed continuous operation for a period of more than 1050 hours without any symptom of polymer formation. The cyanobutadiene so prepared contained 99.5 to 99.8% monomeric cyanobutadiene.

Example 2

The extracting column 8 was omitted. In this case a dilute solution of cyanobutadiene in acrylonitrile (e.g. 69% acrylonitrile, 30% cyanobutadiene, 1% lactonitrile) of the type obtained in residue column 2 as distillation sump product in the commercial production of acrylonitrile, was introduced through lines 7, 7a and 11 into preliminary column 13. The temperature in the jacketed and still portions of the column were increased to 75° C. so as to obtain a sump product free from acrylonitrile. The acrylonitrile withdrawn through line 16 still included 5–10% cyanobutadiene and was recycled through line 16a into residue column 2. The distillation conditions in column 21 remained unchanged. Columns 2, 8, 13 and 21 were preferably packed with filling material or spray pack.

The claims:
1. A continuous process for isolating and purifying 1-cyanobutadiene-(1,3) from a crude liquid mixture containing said 1-cyanobutadiene-(1,3) which comprises admixing the crude liquid with a phenol and a non-volatile acid serving as a stabilizer; introducing the resulting stabilized mixture into the upper portion of a first distilling stage; removing low-boiling constituents of said stabilized mixture at the top portion of the said first distilling stage at a temperature within the range of about 38° C. to 58° C. and under a pressure within the range of about 100 to 400 mm. mercury; introducing gaseous nitrogen monoxide into the lower portion of said first distilling stage above a sump zone therein; passing the cyanobutadiene-containing product collected in said sump zone of said first distilling stage approximately into the center portion of a second distilling stage operated under reduced pressure; withdrawing monomeric cyanobutadiene at the top portion of said second distilling stage; introducing gaseous nitrogen monoxide into the lower portion of said second distilling stage above a sump zone therein; retaining dimeric and polymeric cyanobutadiene and high-boiling contaminants in said sump zone of said second distilling stage, the said sump zone in the said second distilling stage being maintained at a maximum temperature of 75° C.; and expelling the dimeric and polymeric cyanobutadiene and the high-boiling contaminants from the sump zone in the said second distilling stage.

2. A process as claimed in claim 1 wherein the phenol used as a stabilizer is at least one member selected from the group consisting of hydroquinone, ortho-, meta-, para-phenolsulfonic acids, $\alpha$- and $\beta$-naphtholsulfonic acids, 1-naphthol-2-nitroso-4-sulfonic acid, and 1-naphthol-2-nitroso-4,7-disulfonic acid, and the non-volatile acid used as a stabilizer is at least one member selected from the group consisting of phosphoric acid, sulfuric acid, toluenesulfonic acids, naphthalene-sulfonic acids, ortho-, meta-, para-phenolsulfonic acids, $\alpha$- and $\beta$-naphtholsulfonic acids, 1-naphthol-2-nitroso-4-sulfonic acid, and 1-naphthol-2-nitroso-4,7-disulfonic acid.

3. A process as claimed in claim 1, wherein the upper portion of the first distilling stage is maintained at a temperature within the range of about 47° C. to 49° C. and under a pressure of about 180 mm. mercury.

4. A process as claimed in claim 1, wherein the constituents of the stabilized liquid mixture removed at the top portion of the first distilling stage are at least one member selected from the group consisting of acrylonitrile, water, and croton-aldehyde.

5. A process as claimed in claim 1, wherein the second distilling stage is operated under a pressure within the range of about 5 to 20 mm. mercury and the top portion of the said second distilling stage is maintained at a temperature within the range of about 25 to 36° C.

6. A process as claimed in claim 1, wherein $1/100$ to 1% by weight, calculated on the cyanobutadiene feed, each of at least one member selected from the group consisting of phenols and non-volatile acids dissolved in pure cyanobutadiene, is introduced as an additional stabilizer into the top portions of the first and the second distilling stages.

7. A process as claimed in claim 1, wherein $10^{-3}$ to $10^{-1}$ percent by weight nitrogen monoxide as a stabilizer, calculated on the cyanobutadiene feed, is introduced in measured quantities into each of the first and the second distilling stages.

8. A process as claimed in claim 1, wherein a maximum of 10% by weight trimethyl benzenes is admixed with the product collecting in the sump portion of the second distilling stage.

References Cited

UNITED STATES PATENTS

| | | | |
|---|---|---|---|
| 2,175,805 | 10/1939 | Jacobson | 203—9 |
| 2,386,365 | 10/1945 | Staudinger | 203—8 |
| 2,388,041 | 10/1945 | Craig | 203—9 |
| 2,481,080 | 9/1949 | Castner | 203—8 |
| 2,557,684 | 6/1951 | Powers | 203—9 |
| 2,570,066 | 10/1951 | Morrow et al. | 203—69 |
| 2,874,099 | 2/1959 | Mecorney | 203—8 |
| 2,947,777 | 10/1960 | Lovett | 260—465.9 |
| 3,090,804 | 5/1963 | Sennewald et al. | 260—465.9 |

WILBUR L. BASCOMB, Jr., *Primary Examiner.*